United States Patent Office 3,527,954
Patented Sept. 8, 1970

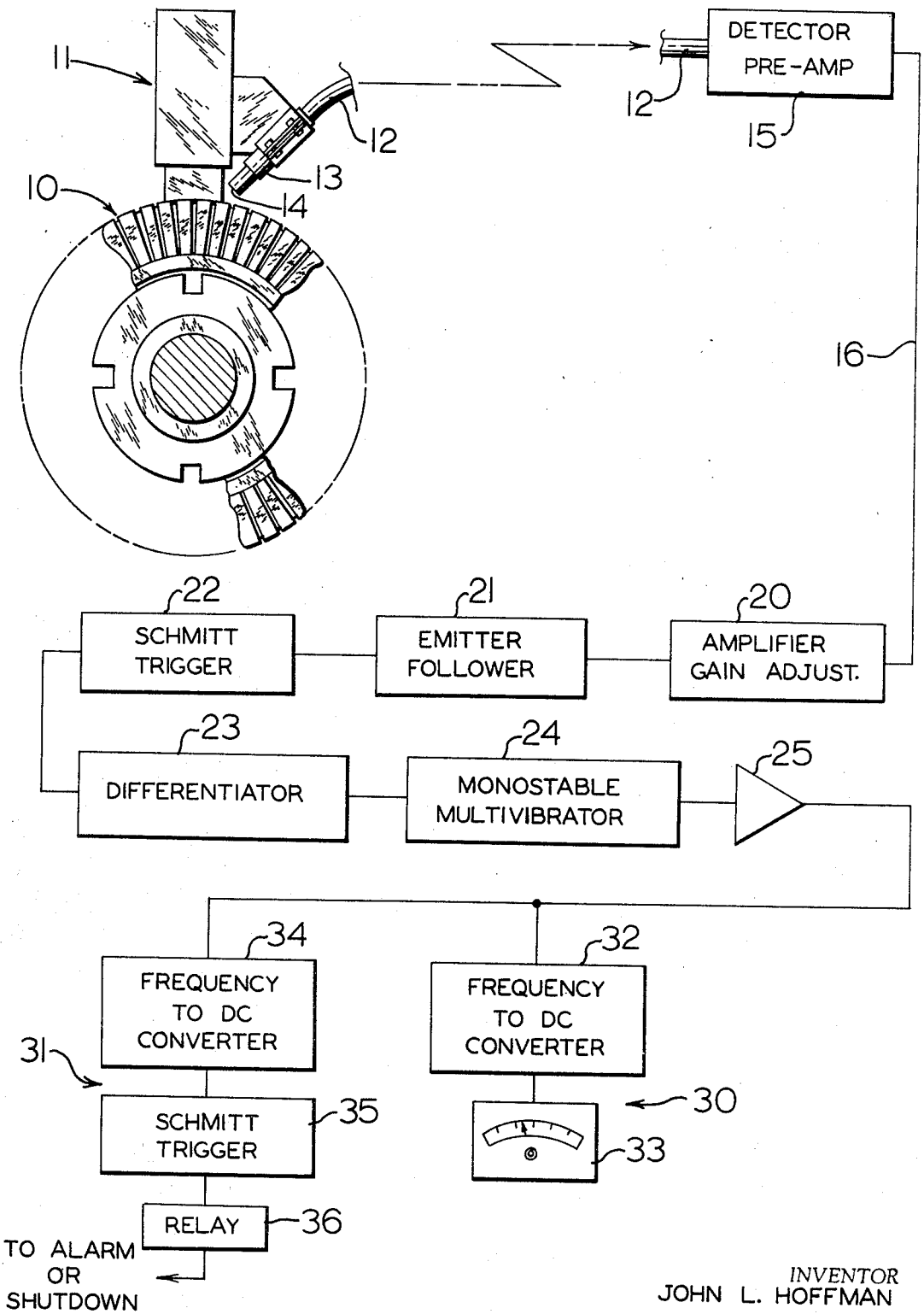
Sept. 8, 1970  3,527,954
SPARK MONITOR FOR DIRECT CURRENT MOTORS AND GENERATORS
Filed April 22, 1968
INVENTOR
JOHN L. HOFFMAN

3,527,954
SPARK MONITOR FOR DIRECT CURRENT MOTORS AND GENERATORS
John L. Hoffman, Tazewell County, Ill., assignor to Caterpillar Tractor Co., Peoria, Ill., a corporation of Illinois
Filed Apr. 22, 1968, Ser. No. 722,954
Int. Cl. G02b 5/14, 5/16
U.S. Cl. 250—227                                     3 Claims

ABSTRACT OF THE DISCLOSURE

A system for detecting and measuring the rate of sparking at the brushes of direct current motors and generators which uses optical fibers for detecting the visible light resulting from the sparking and transmitting this light to a remote location outside the influence of the field of the machine, where it is detected and converted to an electrical signal that is transmitted to a monitoring circuit. The monitoring circuit includes means for visually displaying the amplitude of the electrical signal which is proportional to sparking at the brushes and can include a safety circuit that can actuate an alarm or shut down the machine.

BACKGROUND OF THE INVENTION

The present invention relates to a system for determining the intensity level and monitoring the rate of sparking that occurs at the brushes of direct current electric motors and generators that are hereinafter referred to as DC machinery. DC machinery requires the use of a commutator and brushes for proper transmission of electrical power between the armature windings and external circuitry. The rate or intensity of the sparking at the brushes is influenced to a considerable extent by how close the brushes are positioned to the neutral axis of the machine's magnetic field. Generally, it is possible to improve the commutation and reduce the sparking between the brushes and the commutator by adjusting the brushes so that they are aligned with the neutral axis of the magnetic field. In smaller machinery, this is accomplished by physically shifting the brushes with respect to the magnetic field while on larger machinery interpoles are placed between the main field windings to shift the neutral axis of the composite magnetic field so that it is coincident with the brushes. Even in the larger machinery, a small amount of physical adjustment of the brush holders is utilized so both the interpole effect and the movement of the brushes can be employed to obtain the best commutation possible.

In the past, it has been common practice to determine the intensity of the brush sparking by simple visual observation. While visual monitoring is satisfactory, it does present several difficulties, particularly the difficulty of accurately observing the precise area at which the sparking may occur. In order to visually observe the sparking, the observer must be physically close to the brush ring and other internal parts of the machine, or must use various viewing devices, such as mirrors and the like. Often there is a dangerous situation where the observer can be physically injured because of his close proximity to the machine and associated equipment.

Also in the past it has been suggested that various light detecting means such as photo-multipliers, photo-cells and photo-tubes could be used in conjunction with appropriate instrumentation to measure the intensity of the sparking. However, all of the circuits involving these various light detecting devices require that sensitive circuitry be installed within the machine and in these locations a circuit is plagued with the problems of interference from the magnetic field of the machine while monitoring relatively low signal levels. Variation in output signals from such circuits reduces the sensitivity of the detecting system, making it less desirable than visual monitoring.

SUMMARY OF THE INVENTION

The present invention solves the above problems by utilizing a means for transmitting the light generated by the sparking to a position external to the machine. More particularly, the light is transmitted to a remote position that is outside the main influence of the magnetic field of the machine by a fiber light guide. At the remote location, the light is converted to a related electrical signal by photo-electric means, such as a photo-sensitive field effect transistor.

This electrical signal is then connected to a monitoring circuit where it may be usually displayed to indicate the rate or intensity of the sparking and in addition may be used to operate a safety circuit. The safety circuit can include means for actuating an alarm circuit and/or a shut-down circuit for shutting down the machinery should the dangerous sparking condition arise. Such a system allows the brush to be properly adjusted and any unsafe operating conditions to be detected quickly.

Using a fiber light guide for both detecting the light and transmitting it to a remote location, removed from the main effect of the magnetic fields of the machine, permits the placing of the sensitive electrical circuits outside the influence of the machine's magnetic field. The electrical circuits that detect the light flashes transmitted by the fiber light guide can also include suitable means for preamplifying the signal so that it may be transmitted to a monitoring circuit located a considerable distance from the machine being monitored. The light transmitting means may take various forms but is preferably a flexible fiber light guide which has good light transmitting qualities in addition to the ability to "pipe" the light around corners and enables the system to transmit the needed information to the remote location conveniently and effectively.

BRIEF DESCRIPTION OF THE DRAWINGS

The above advantages and the construction of this invention will be more easily understood from the following detailed description of a preferred embodiment when taken in conjunction with the attached drawing showing in block diagram form a monitoring system constructed according to this invention.

DESCRIPTION OF THE PREFERRED EMBODIMENT

Referring now to the drawing, showing a preferred embodiment of the invention, the rate of the sparking is picked up by a suitable light detecting and transmitting means. More particularly, a commutator 10 of a DC machine having a brush assembly 11 has mounted on the brush assembly a light guide means 12, which is preferably a flexible fiber light guide. The end 13 of the fiber light guide is generally attached directly to the brush holder, since it is an electrical insulator, and positioned so that the detecting end 14 of the light guide is directly adjacent the contact area between the brush and the commutator. The light guide is lead out of the machine and its opposite end secured to the detector and preamplifier assembly 15. This detector and preamplifier assembly can be mounted on the frame of the machine but is removed sufficiently so as to be outside the main influence of the magnetic field of the machine. In addition, the detector and preamplifier assembly should be shielded to isolate it from stray electro magnetic fields. The light guide, of course, may be of any desired length although by keeping the length short, it is possible to reduce the cost of the system.

The detector can comprise various photo-electrical devices but is preferably a photo-sensitive field effect transistor. This is, of course, a solid state device which has a very low power requirement and a very low background noise level. The detector is coupled to a preamplifier which serves to both amplify the signal as well as match the impedance of the detecting device to the transmission line 16. The amplifier is preferably a solid state circuit that can perform the dual function of amplifying the signal as well as matching the impedance of the transmission line 16. For example, a solid state emitter follower circuit may be used.

The transmission line length is not critical and serves to couple the detector preamplifier to the monitoring circuit. For example, it is possible to mount the DC machinery in a test cell and locate the monitoring circuit outside the test cell where it can be observed by an operator. Thus, the transmission line may be from several feet to a hundred feet or more in length. It is possible to transmit the signal over a considerable distance since the signal has already been amplified, and in addition, the impedance between the preamplifier and the transmission line is normaly matched. The transmission line supplies the signal to an amplifier-gain adjusting circuit 20 which may be a conventional amplifier having an adjustable gain. The adjustable gain is preferably calibrated in fixed increments or levels so that various spark rates or intensities may be monitored.

The amplifier is coupled to a second emitter follower circuit 21 which serves as an impedance match between the amplifier and a level detecting circuit 22. The level detecting circuit serves as a means for setting the sensitivity level of the circuit and is shown as a Schmitt trigger circuit. Thus, whenever the signal from the detector preamplifier exceeds the triggering level of the Schmitt circuit, it will conduct and continue to conduct until the signal level falls below a cutoff level. The Schmitt circuit operates as a level detecting and pulse shaping circuit whose output is a series of rectangular pulses, each pulse representing an input pulse that exceeded its triggering level. Since the input pulses are proportional to the sparking of the brushes, the frequency of the output pulses are proportional to the rate of sparking that exceeds a selected level set by the gain adjusting circuit 20.

The Schmitt trigger is coupled to a differentiating circuit 23 that serves to convert the Schmitt trigger pulse to a sharp positive spike and a negative spike. Since the negative spike is not needed, it may be removed from the system by use of a diode circuit. The differentiator is coupled to a monostable multi-vibrator circuit 24 that generates a rectangular, constant width pulse whose frequency is again a measure of the rate of the sparking that exceeds the selected level. The multi-vibrator is coupled to a limiting amplifier 25 that serves to amplify and limit the pulses received from the monostable multi-vibrator.

The output from the amplifier is coupled to a visual display circuit 30 and then a safety circuit 31. This visual display circuit may consist of a frequency to DC converter 32 that is coupled to a visual display device 33. The frequency to DC converter may be a conventional integrating circuit which produces a DC voltage proportional to pulse repetition. Similarly, the visual display device 33 may be a conventional high impedance voltmeter or microammeter for displaying the magnitude of the signal from the frequency to DC converter, and can be calibrated in a suitable manner.

The safety circuit 31 also utilizes a frequency to DC converter 34 which again may be a conventional integrating circuit. The frequency to DC converter is coupled to a Schmitt trigger circuit 35 that serves as a comparing circuit for adjusting the sensitivity level of the safety circuit. Thus, when the level of the signal from the frequency to DC converter exceeds the triggering level of the Schmitt trigger, the Schmitt trigger will trigger and remain in a conducting state until the input signal falls below its cut-off level. This output pulse can be used to actuate a relay 36 to operate an external alarm or actuate a circuit for shutting down the machinery.

OPERATION

The monitoring system of the present invention is operated by first installing the light guide means directly on the machine by securing the light guide means to the brush assembly so that its pickup end is directly adjacent the contact area between the brushes and the commutator. The detector and preamplifier assembly are then located on the machine, outside the effect of the magnetic field of the machine. In some cases, it may be desirable to permanently install the monitoring system on the machinery, for example, in the case of large stationary direct current machinery or large traction motors, where continuous and automatic monitoring is desired. In other instances, it may be desirable to provide a portable monitoring system which may be changed from machine to machine. The latter arrangement would be desirable in the case of a monitoring system used to check or ascertain the condition of new equipment or rebuilt equipment.

After installing the light guide means, its detector and preamplifier are coupled to the monitoring circuit by a suitable shielded conductor and the system is ready for use when supplied with suitable power to the various circuits. As the DC machinery is operated, the operating sparking level or spark intensity of the system can be monitored. As pointed out above, this can be accomplished by providing suitable gain adjustment in the amplifier circuits 20 for different levels or ranges. Preferably, these would be step gain adjustments of fixed predetermined values so that the visual displaying means may be calibrated accordingly. Since the Schmitt trigger circuit has a set triggering level, any change in the amplifier gain will change the sparking level at which the Schmitt circuit triggers.

As the DC machine is operated, the light guide will pick up the light flashes created by the sparking and transmit them to its detector and preamplifier. The detector, being a photoelectrical type of device, will convert the flashes into resulting electrical signals. When amplified, the signals are then supplied to the gain control and level detector that may be a Schmitt trigger circuit. Whenever the amplitude of the pulses exceeds the selected level of the detecting circuit, the Schmitt trigger will change its state of condition and transmit a rectangular pulse to the remaining circuits. The length of the pulse will depend on the time that the Schmitt circuit conducts which, of course, depends on the level of the input pulse. Thus, the frequency of the output pulses will be directly proportional to the rate of the sparking to the extent it exceeds the level set in the gain control circuit. The remaining circuitry will then shape the output pulses and supply them both to the visual display circuits as well as the safety circuits. The safety circuits normally are employed to operate to shut-down the machinery or sound an audible alarm. While the shut-down circuits are not shown, obviously relays operated by the minitoring circuit can be used to actuate any desired conventional circuit.

From the above description, it can be readily appreciated that the present invention supplies a simple monitoring circuit that accurately measures the rate of sparking of a DC machine. Since the sensitive electronic circuits are placed outside the main influence of the magnetic field of the machine, the magnetic field will not distort the resulting electrical signals, and the resulting undistorted signals are employed to accurately measure the actual rate of the sparking as it exceeds the sensitivity level selected.

What is claimed is:

1. A spark detecting system for monitoring the rate of sparking between the commutator and brushes of an electrical machine comprising:

a bracket located adjacent to the contacting surfaces of at least one brush and said commutator;

a fiber optical light guide, said fiber optical light guide being electrical non-conductive and having one end supported by said bracket so it is optically oriented to sense sparking between said brush and said commutator, said fiber optical light guide also being of sufficient length that its other end is positioned remote of the main electrical influences of said electrical machine;

a light shielded and magnetically shielded light sensitive transducer connected to said other end of said fiber optical light guide to respond to light transmitted therethrough;

a preamplifier juxtaposed and having its input connected to said light sensitive transducer;

an amplifier gain adjusting circuit having its input connected to the output of said preamplifier;

a sparking level detecting circuit having its input connected to the output of said amplifier adjusting circuit, said sparking level detecting circuit providing output pulse each time an input signal exceeds a predetermined level;

pulse responsive means connected to receive the output pulses of said level detecting circuit and providing a proportional display signal related to the sparking rate of said electrical machine.

2. The system of claim 1 wherein said sparking level detecting means comprises a Schmitt trigger circuit.

3. The system of claim 1 wherein said indicating means comprises circuit means for producing a DC signal proportional to pulse frequency and a visual means for displaying said signal.

References Cited

UNITED STATES PATENTS

| | | | |
|---|---|---|---|
| 2,975,785 | 3/1961 | Sheldon | 350—96 X |
| 3,156,115 | 11/1964 | Adelmann | 73—198 |
| 3,244,894 | 4/1966 | Steele et al. | 250—83.3 X |

OTHER REFERENCES

G. K. Oertez and M. D. Williams, "Optical Measurement of Switch Jitter," Review of Scientific Instruments, v. 36, No. 5, May 1965.

American Optical Co. Technical Publication, Model FS-163 Fiberscope, printed 1967, filed July 1968.

American Optical Co. Technical Publication, Model FS-41 Fiberscope, printed 1968, filed July 1968.

JAMES W. LAWRENCE, Primary Examiner

D. O'REILLY, Assistant Examiner

U.S. Cl. X.R.

73—71.1; 350—96